US009749011B2

(12) United States Patent
Kim et al.

(10) Patent No.: US 9,749,011 B2
(45) Date of Patent: Aug. 29, 2017

(54) PHYSICAL UNIDIRECTIONAL COMMUNICATION APPARATUS AND METHOD

(71) Applicant: ELECTRONICS AND TELECOMMUNICATIONS RESEARCH INSTITUTE, Daejeon (KR)

(72) Inventors: Kyoung-Ho Kim, Gokseong-gun (KR); Jeong-Han Yun, Daejeon (KR); Heemin Kim, Daejeon (KR); Manhyun Chung, Daejeon (KR); Woonyon Kim, Daejeon (KR); Eung Ki Park, Daejeon (KR); Sangwoo Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/790,074

(22) Filed: Jul. 2, 2015

(65) Prior Publication Data
US 2016/0080033 A1    Mar. 17, 2016

(30) Foreign Application Priority Data
Sep. 11, 2014    (KR) ......................... 10-2014-0120001

(51) Int. Cl.
H04L 5/16       (2006.01)
H04B 3/50       (2006.01)
H04L 29/06      (2006.01)

(52) U.S. Cl.
CPC .......... *H04B 3/50* (2013.01); *H04L 63/1425* (2013.01)

(58) Field of Classification Search
CPC    H04B 3/50; H04L 29/06; H04L 63/02; H04L 63/0227; H04L 63/10; H04L 63/12
(Continued)

(56) References Cited

U.S. PATENT DOCUMENTS 4,422,171 A * 12/1983 Wortley ............. H04B 7/18513
                                                    375/E7.016
5,703,562 A * 12/1997 Nilsen ................. G06F 11/1625
                                                    340/286.02
(Continued)

FOREIGN PATENT DOCUMENTS

CN    101527665 B    7/2012
JP    2004-120667 A  4/2004
(Continued)

*Primary Examiner* — Khanh C Tran
(74) *Attorney, Agent, or Firm* — LRK Patent Law Firm

(57) ABSTRACT

A physical unidirectional communication apparatus and method intended to utilize a structure that exploits an electrical signal by which data cannot be transmitted and to guarantee the reliability of data transmission via a transmission method that uses the structure. The physical unidirectional communication apparatus includes a unidirectional data transmission line, a data reception status transmission line, an internal network connection system unit for performing communication with an internal network transmission host and transmitting transmission data to an external network connection system unit through the unidirectional data transmission line, and the external network connection system unit for performing communication with an external network reception host, receiving the transmission data from the internal network connection system unit, generating reception status information of the transmission data, and transmitting the reception status information to the internal network connection system unit through the data reception status transmission line.

17 Claims, 10 Drawing Sheets

(58) Field of Classification Search
USPC ......... 375/220, 285, 340; 370/282; 726/3–4, 726/11, 13–14, 27
See application file for complete search history.

(56) References Cited

U.S. PATENT DOCUMENTS

| | | | | |
|---|---|---|---|---|
| 7,649,452 | B2* | 1/2010 | Zilberstein | G05B 23/0208 340/531 |
| 7,941,526 | B1* | 5/2011 | Hope | H04L 41/069 709/224 |
| 8,891,546 | B1* | 11/2014 | Frenkel | H04L 63/1441 370/252 |
| 8,898,227 | B1* | 11/2014 | Mraz | H04L 67/42 709/203 |
| 8,938,795 | B2* | 1/2015 | Clarke | H04N 21/236 726/13 |
| 8,997,202 | B2* | 3/2015 | Curry | H04L 63/0281 709/238 |
| 9,094,401 | B2* | 7/2015 | Mraz | H04L 63/10 |
| 2006/0026292 | A1 | 2/2006 | Namioka et al. | |
| 2009/0282145 | A1 | 11/2009 | Niimi | |
| 2014/0215609 | A1 | 7/2014 | Fukami | |
| 2015/0020194 | A1* | 1/2015 | Mraz | H04L 69/40 726/22 |
| 2015/0261810 | A1* | 9/2015 | Kim | G06F 21/6218 707/687 |

FOREIGN PATENT DOCUMENTS

| | | |
|---|---|---|
| JP | 2014-140096 A | 7/2014 |
| JP | 2014-146087 A | 8/2014 |
| KR | 10-2009-0128405 A | 12/2009 |
| KR | 10-2011-0040004 A | 4/2011 |
| KR | 10-2013-0024660 A | 3/2013 |
| KR | 10-2013-0046276 A | 5/2013 |
| WO | 2008/112396 A1 | 9/2008 |

* cited by examiner

PHYSICAL UNIDIRECTIONAL COMMUNICATION APPARATUS AND METHOD

CROSS REFERENCE TO RELATED APPLICATION

This application claims the benefit of Korean Patent Application No. 10-2014-0120001, filed Sep. 11, 2014, which is hereby incorporated by reference in its entirety into this application.

BACKGROUND OF THE INVENTION

1. Technical Field

The present invention generally relates to a physical unidirectional communication structure and method and, more particularly, to a communication apparatus and method that generate a separate electrical signal transmission path through which data cannot be transmitted or received so as to solve the reliability problem of transmission that occurs due to the structural limitation of a physical unidirectional data transfer, thus allowing a transmitting side to detect the status of a receiving side.

2. Description of the Related Art

A physical unidirectional data transfer system denotes network security equipment that physically blocks the transmission of data from an external network to an internal network (local network) while enabling the transmission of data from the internal network to the external network, thus fundamentally preventing intrusion made via the external network.

Physical unidirectional data transfer technology includes technology for exploiting an Unshielded Twisted Pair (UTP) cable after cutting the reception (RX) line thereof, technology for cutting and exploiting a serial cable, technology for eliminating the RX line of a photoconverter, etc.

However, such a scheme for cutting a line and physically transmitting unidirectional data has a risk of data loss. In order to compensate for such data loss, there are presented a method of adjusting the size of a buffer and a transfer rate, a method of using a separate control line (using data), etc. However, in a situation in which the status of the receiving side is not known, such a buffer size or transfer rate adjustment method is not a perfect countermeasure. Further, the method of using a separate circuit line has the possibility of the control line itself being misused as an intrusion path.

That is, existing physical unidirectional data transfer technology eliminates the RX line of an internal network connection system in a data transmission section to guarantee physical unidirectionality. By means of this method, malicious data transfer attempted via an external network connection system may be fundamentally blocked, but a problem arises in that the reliability of data is deteriorated.

Korean Patent Application Publication No. 10-2011-0040004 entitled "System and method for transferring data only in one direction" relates to a unidirectional data transfer system and method that transmit data from a network requiring high security to a network requiring low security. This patent discloses technology for physically blocking access from a low-security network to a high-security network while transmitting data from the high-security network to the low-security network. However, the above patent does not present technology in which a separate unidirectional line capable of transferring the status information of a receiving side is used and in which the status of the receiving side is transferred to a transmitting side through the line.

That is, the above patent does not mention technology for transferring context, such as a data reception failure or the occurrence of a problem on a receiving side and then guaranteeing the reliability of data transmission in a unidirectional section using a method, such as data retransmission or delayed transmission.

SUMMARY OF THE INVENTION

Accordingly, the present invention has been made keeping in mind the above problems occurring in the prior art, and an object of the present invention is to utilize a structure that exploits an electrical signal by which data cannot be transmitted, and to guarantee the reliability of data transmission via a transmission method that uses the structure.

Other objects of the present invention will be easily understood from the description of the following embodiments.

In accordance with an aspect of the present invention to accomplish the above object, there is provided a physical unidirectional communication apparatus, including a unidirectional data transmission line; a data reception status transmission line; an internal network connection system unit for performing communication with an internal network transmission host and transmitting transmission data to an external network connection system unit through the unidirectional data transmission line; and the external network connection system unit for performing communication with an external network reception host, receiving the transmission data from the internal network connection system unit, generating reception status information of the transmission data, and transmitting the reception status information to the internal network connection system unit through the data reception status transmission line.

The internal network connection system unit may include an internal communication agent for receiving the transmission data from the internal network transmission host and transmitting the transmission data to a unidirectional communication manager; and an internal unidirectional communication manager for transmitting the transmission data to the external network connection system unit through the unidirectional data transmission line, and wherein the external network connection system unit may include an external communication agent for transmitting the transmission data received from the internal network connection system unit to the external network reception host; and an external unidirectional communication manager for analyzing the transmission data received from the internal network connection system unit, generating the reception status information, and transmitting the reception status information to the internal unidirectional communication manager.

The unidirectional data transmission line may be connected to a diode so that the transmission data is transmitted only in a direction from the internal network connection system, unit to the external network connection system unit.

The data reception status transmission line may include N lines (N is a natural number), each line transmitting only electrical ON and OFF states without being able to transmit data.

Each line of the data reception status transmission line may be connected to a diode, thus enabling an electrical signal to be transferred only in a direction from the external network connection system unit to the internal network connection system unit.

The internal unidirectional communication manager or the external unidirectional communication manager may deactivate an auto-medium dependent interface crossover (MDIX) function so as to prevent data from being transmitted from an external network to an internal network through the unidirectional data transmission line.

The external unidirectional communication manager may analyze the received transmission data, generate the reception status information requiring retransmission of transmission data in which an error has occurred, and transmit the reception status information to the internal unidirectional communication manager, and the internal unidirectional communication manager may receive and analyzes the reception status information, detect the transmission data in which the error has occurred, and perform control such that data ranging from the transmission data in which the error has occurred is retransmitted.

The internal unidirectional communication manager may include memory for storing information obtained from communication with the internal communication agent, and periodically initialize the memory so that the information obtained from communication with the internal communication agent does not remain in the memory, and the external unidirectional communication manager may include memory for storing information obtained from communication with the external communication agent, and periodically initialize the memory so that the information obtained from communication with the external communication agent does not remain in the memory.

The physical unidirectional communication apparatus may further include a monitoring device configured to monitor an operation and data communication status of the physical unidirectional communication apparatus via the monitoring device.

When the monitoring device is present in the internal network, the internal network connection system unit may further include a monitoring information manager, and the monitoring device may be directly connected to the monitoring information manager and may be connected to the external network connection system unit through a physical unidirectional communication system.

When the monitoring device is present in the external network, the monitoring device may be connected to the internal network connection system unit through a physical unidirectional communication system.

The monitoring device may be connected to the internal network connection system unit and to the external network connection system unit through respective physical unidirectional communication systems.

In accordance with another aspect of the present invention to accomplish the above object, there is provided a physical unidirectional communication method, including receiving, by an internal network connection system unit, transmission data from an internal network; transmitting the transmission data to an external network connection system unit through a physically configured unidirectional data transmission line; generating, by an external unidirectional communication manager, data reception status information of the transmission data and transmitting the data reception status information to the internal network connection system unit through a data reception status transmission line; analyzing, by an internal unidirectional communication manager, the data reception status information; and retransmitting, by the internal unidirectional communication manager, data in which an error has occurred to the external network connection system unit through the unidirectional data transmission line.

Transmitting the transmission data to the external network connection system unit through the physically configured unidirectional data transmission line may include deactivating an auto-medium dependent interface crossover (MDIX) function, thus enabling data to be transferred only in one direction from the internal network connection system unit to the external network connection system unit.

The internal unidirectional communication manager may include memory for storing information obtained from communication with an internal communication agent, and periodically initializes the memory so that the information obtained from communication with the internal communication agent does not remain in the memory, and the external unidirectional communication manager includes memory for storing information obtained from communication with an external communication agent, and periodically initializes the memory so that the information obtained from communication with the external communication agent does not remain in the memory.

The physical unidirectional communication method may further include, when retransmission of identical data repeatedly occurs as a result of analysis of the data reception status information, counting, by the internal unidirectional communication manager, a number of retransmissions, and stopping retransmission of the transmission data to the external network connection system unit if the number of retransmissions reaches a predetermined number or more.

The physical unidirectional communication method may further include monitoring operation and data communication status of a physical unidirectional communication apparatus via a monitoring device.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The present invention may be variously changed and may have various embodiments, and specific embodiments will be described in detail below with reference to the attached drawings. However, it should be understood that those embodiments are not intended to limit the present invention to specific disclosure forms and they include all changes, equivalents or modifications included in the spirit and scope of the present invention.

The terms used in the present specification are merely used to describe specific embodiments and are not intended to limit the present invention. A singular expression includes a plural expression unless a description to the contrary is specifically pointed out in context.

Hereinafter, embodiments of the present invention will be described in detail with reference to the attached drawings.

Figure 1:
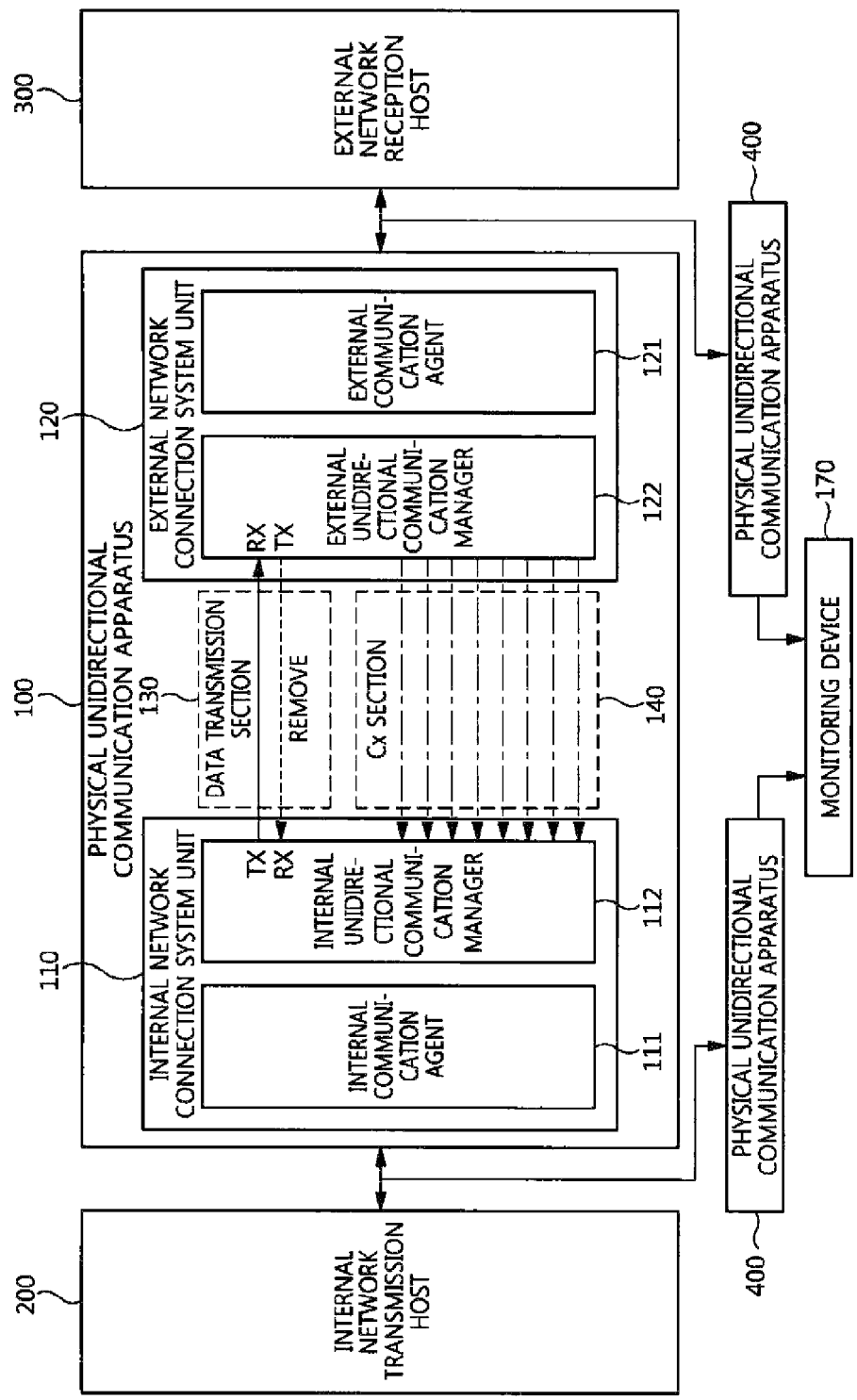
FIG. 1 is a configuration diagram showing a physical unidirectional communication apparatus according to an embodiment of the present invention.

FIG. 1 is a configuration diagram of a physical unidirectional communication apparatus according to an embodiment of the present invention.

A physical unidirectional communication apparatus 100 according to the present invention includes an internal network connection system unit 110, an external network connection system unit 120, a unidirectional data transmission line 130, and a data reception status transmission line 140.

The internal network connection system unit 110 is connected to an internal network transmission host 200 to perform communication with the internal network transmission host 200.

The external network connection system unit 120 is connected to an external network reception host 300 to perform communication with the external network reception host 300.

The unidirectional data transmission line 130 is a transmission line having physical unidirectionality, which enables data transmission to be performed only in a direction from the internal network connection system unit 110 to the external network connection system unit 120.

For this, the unidirectional data transmission line 130 is configured such that the transmission line enabling data transmission to be performed only in the direction from the internal network connection system unit 110 to the external network connection system unit 120 is left, and such that a transmission line enabling data transmission to be performed in a direction from the external network connection system unit 120 to the internal network connection system unit 110 is removed.

Therefore, the unidirectional data transmission line 130 may merely transmit the data of the internal network to the external network and does not transmit the data of the external network to the internal network. Due to the characteristics of the unidirectional data transmission line 130, intrusion from the external network into the internal network may be fundamentally prevented.

The data reception status transmission line 140 is a communication line formed between the internal network connection system unit 110 and the external network connection system unit 120 and is a transmission unit for providing data reception status information generated by the external network connection system unit 120 to the internal network connection system unit 110.

The internal network connection system unit 110 includes an internal communication agent III and an internal unidirectional communication manager 112.

The internal communication agent 111 functions to communicate with the internal network transmission host 200.

The internal unidirectional communication manager 112 transmits the data of the internal network, which is received from the internal communication agent 111, to the external network connection system unit 120 through the unidirectional data transmission line 130.

The external network connection system unit 120 includes an external communication agent 121 and an external unidirectional communication manager 122.

The external communication agent 121 functions to communicate with the external network transmission host 300.

The external unidirectional communication manager 122 analyzes data received from the internal network connection system unit 110 through the unidirectional data transmission line 130 and generates data reception status information. Further, the generated data reception status information is transmitted to the internal network connection system unit 110 through the data reception status transmission line 140.

Here, the internal unidirectional communication manager 112 may analyze the data reception status information received from the external unidirectional communication manager 122, detect data in which an error has occurred, and perform control such that the detected data is retransmitted.

Generally, a data transmission section is configured using an Ethernet communication structure. Therefore, a chip for Ethernet communication is used, and supports Automatic medium-dependent interface crossover (auto-MINX) mode in which a direct cable and a cross cable are automatically recognized and the function of a communication cable is flexibly determined.

However, when such an auto-MDIX mode is supported, there is a probability that a security problem will occur in that when a system in any one direction is intruded, a system in another direction is also intruded. Therefore, in the present invention, the internal unidirectional communication manager 112 or the external unidirectional communication manager 122 may perform a function of preventing data from being transmitted from the external network to the internal network through the unidirectional data transmission line 130 by deactivating the auto-MDIX function.

The physical unidirectional communication apparatus 100 according to the present invention may be connected to the monitoring device 170. Therefore, via the monitoring device 170, the operation and data communication status of the physical unidirectional communication apparatus 100 may be monitored.

Figure 2:
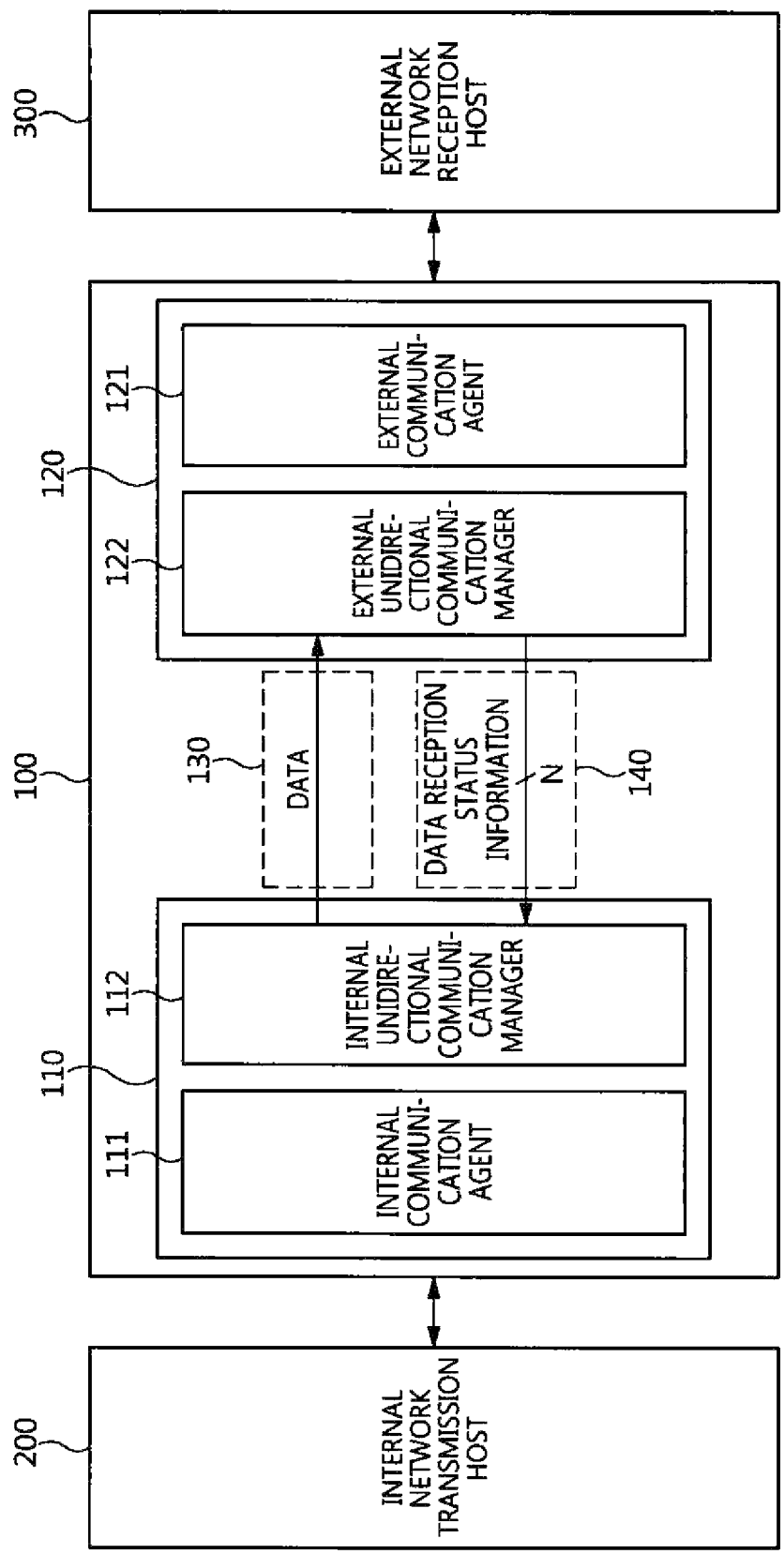
FIG. 2 is a diagram showing the connection of the physical unidirectional communication apparatus to an internal network and an external network according to an embodiment of the present invention.

FIG. 2 is a diagram showing the connection of the physical unidirectional communication apparatus to an internal network and an external network according to an embodiment of the present invention.

The physical unidirectional communication apparatus 100 is connected to the internal network transmission host 200 of the internal network through the internal network connection system unit 110. For this connection, the internal network connection system unit 110 includes an internal communication agent 111. The internal communication agent 111 transmits and receives data to and from the internal network system through the internal network transmission host 200.

The physical unidirectional communication apparatus 100 is connected to the external network reception host 300 of the external network through the external network connection system unit 120. For this connection, the external network connection system unit 120 includes an external communication agent 121. The external communication agent 121 transmits and receives data to and from the external network system through the external network reception host 300.

The data flow of the physical unidirectional communication apparatus 100 according to the present invention will be described below.

The internal communication agent 111 of the internal network connection system unit 110 of the physical unidirectional communication apparatus 100 according to the present invention receives the data of the internal network system while communicating with the internal network transmission host 200.

Further, the received internal network data is transmitted to the external network connection system unit 120 through the unidirectional data transmission line 130.

Here, the external unidirectional communication manager 122 of the external network connection system unit 120 generates data reception status information including the reception status information of the received internal network data, and reports the data reception status information to the internal unidirectional communication manager 112 of the internal network connection system unit 110.

In this regard, the data reception status information is transmitted to the internal unidirectional communication manager 112 of the internal network connection system unit 110 through the data reception status transmission line 140.

The internal unidirectional communication manager 112 may analyze the received data transmission status information, detect data in which an error has occurred, and retransmit the corresponding data.

In this case, the data reception status transmission line 140 is a transmission line that can be used only by electrical ON/OFF signals without being able to transfer data, and is used only to securely transfer various types of status information of the external network to the internal network connection system unit 110.

The data reception status transmission line 140 may be configured using N available lines. In the present invention, the data reception status transmission line 140 including eight lines is described by way of example.

The usage of each line of the data reception status transmission line 140 and a method of retransmitting data when an error occurs in transmission data will be described in detail later with reference to FIG. 10.

The basic function of the physical unidirectional communication apparatus 100 according to the present invention is to link data while separating the network. During this procedure, the linked data may remain in the physical unidirectional communication apparatus 100 in a specific situation. Due thereto, the problem of data leakage may occur. The present invention proposes two methods so as to prevent such data leakage.

First, the possibility of data leakage is present during a procedure in which the internal communication agent 111 of the internal network connection system unit 110 receives data from the internal network transmission host 200 and transfers the received data to the internal unidirectional communication manager 112. Therefore, after the data has been transferred, memory storing the data is completely initialized. The internal unidirectional communication manager 112 also transmits the received data to the unidirectional data transmission line 130, and then initializes the corresponding memory.

The external unidirectional communication manager 122 and the external communication agent 121 of the external network connection system unit 120 initialize memory in the same manner, thus reducing the threat of information leakage.

Also, there is the possibility of information remaining in a specific file during a procedure in which the internal communication agent 111 and the internal unidirectional communication manager 112 exchange data with each other. In order to compensate for such possibility, the internal unidirectional communication manager 112 of the present invention deletes all files used for communication when the system is initialized (rebooted or the like) or when an error occurs, thus reducing information leakage based on the files.

Figure 3:
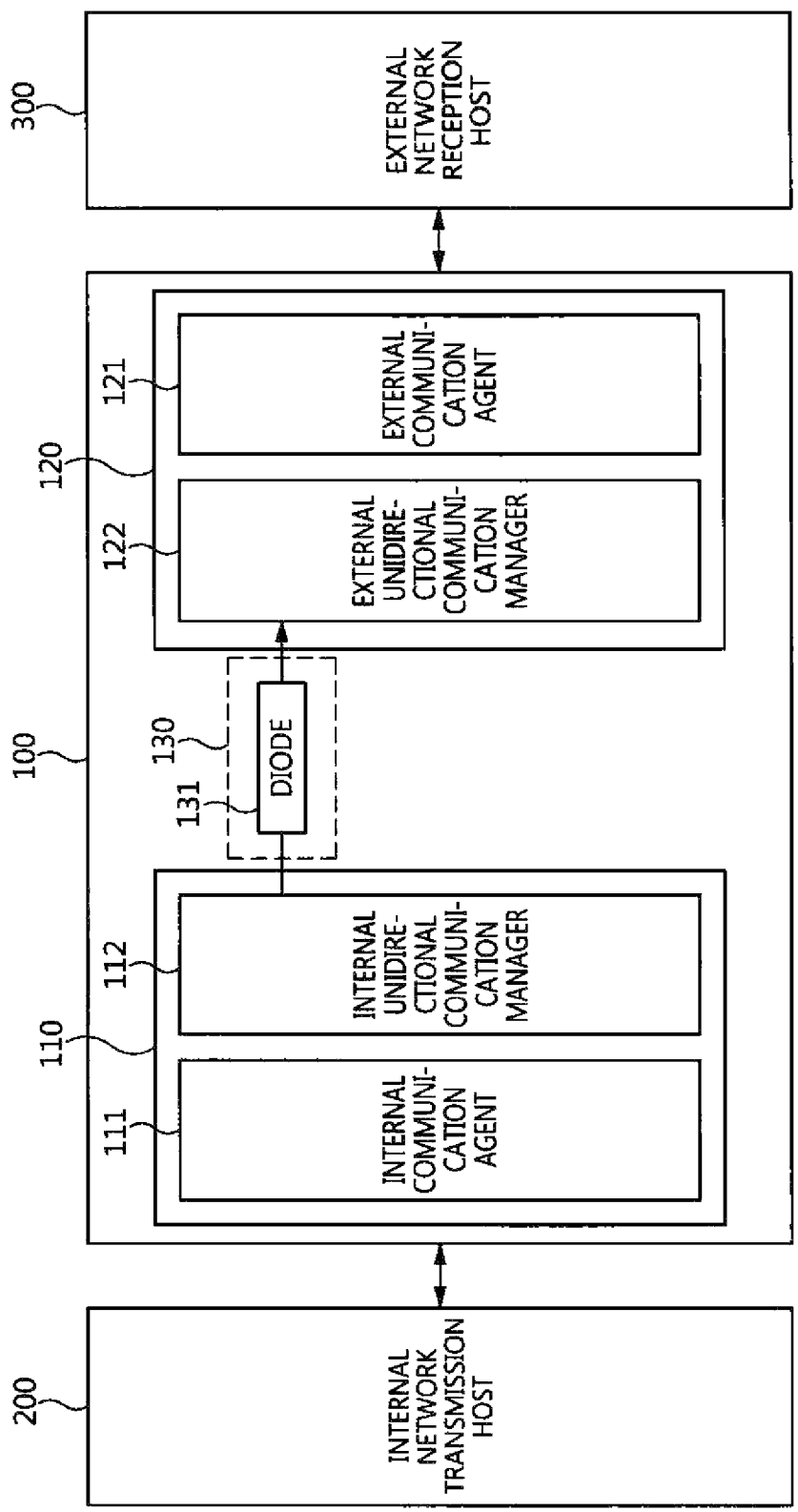
FIG. 3 is a diagram showing the connection of a diode to the unidirectional data transmission line of the physical unidirectional communication apparatus to implement the physical unidirectionality of the unidirectional data transmission line according to an embodiment of the present invention.

FIG. 3 is a diagram showing the connection of a diode to the unidirectional data transmission line of the physical unidirectional communication apparatus to implement physical unidirectionality according to an embodiment of the present invention.

In FIG. 3, a diode 131 is connected to the unidirectional data transmission line 130 so as to guarantee the physical unidirectionality of the unidirectional data transmission line 130.

The diode 131 may transmit electricity only in one direction due to the electrical characteristics thereof. Therefore, reverse data transmission is fundamentally impossible. Using the characteristics of the diode 131, data may be prevented from being transmitted in a direction from the external network to the internal network through the unidirectional data transmission line 130.

Figure 4:
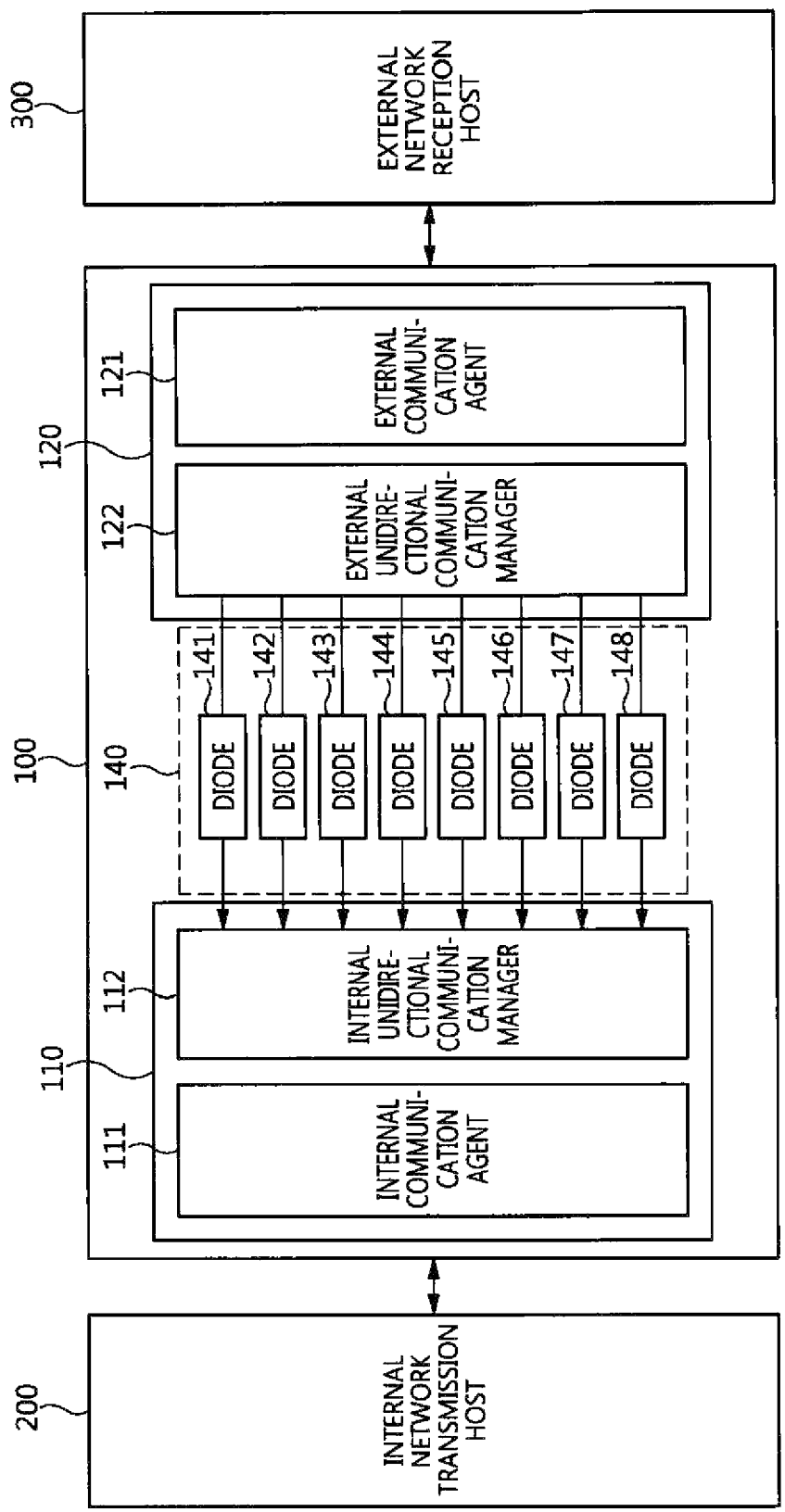
FIG. 4 is a diagram showing the connection of diodes to the data reception status transmission line of the physical unidirectional communication apparatus to implement the physical unidirectionality of the data reception status transmission line according to an embodiment of the present invention.

FIG. 4 is a diagram showing the connection of diodes to the data reception status transmission line of the physical unidirectional communication apparatus to implement the physical unidirectionality of the data reception status transmission line according to an embodiment of the present invention.

In FIG. 4, diodes 141, 142, 143, 144, 145, 146, 147, and 148 are connected to respective lines to guarantee the physical unidirectionality of the data reception status transmission line 140.

As described above, the data reception status transmission line 140 cannot transfer data and can use only electrical ON/OFF signals. However, in order to prevent the possibility of an attack being made through the individual lines of the data reception status transmission line 140, the present invention presents a structure in which the diodes 141, 142, 143, 144, 145, 146, 147, and 148 are connected to the respective lines of the data reception status transmission line 140, thus fundamentally preventing a possibility that electrical signals may move in a reverse direction.

Figure 5:
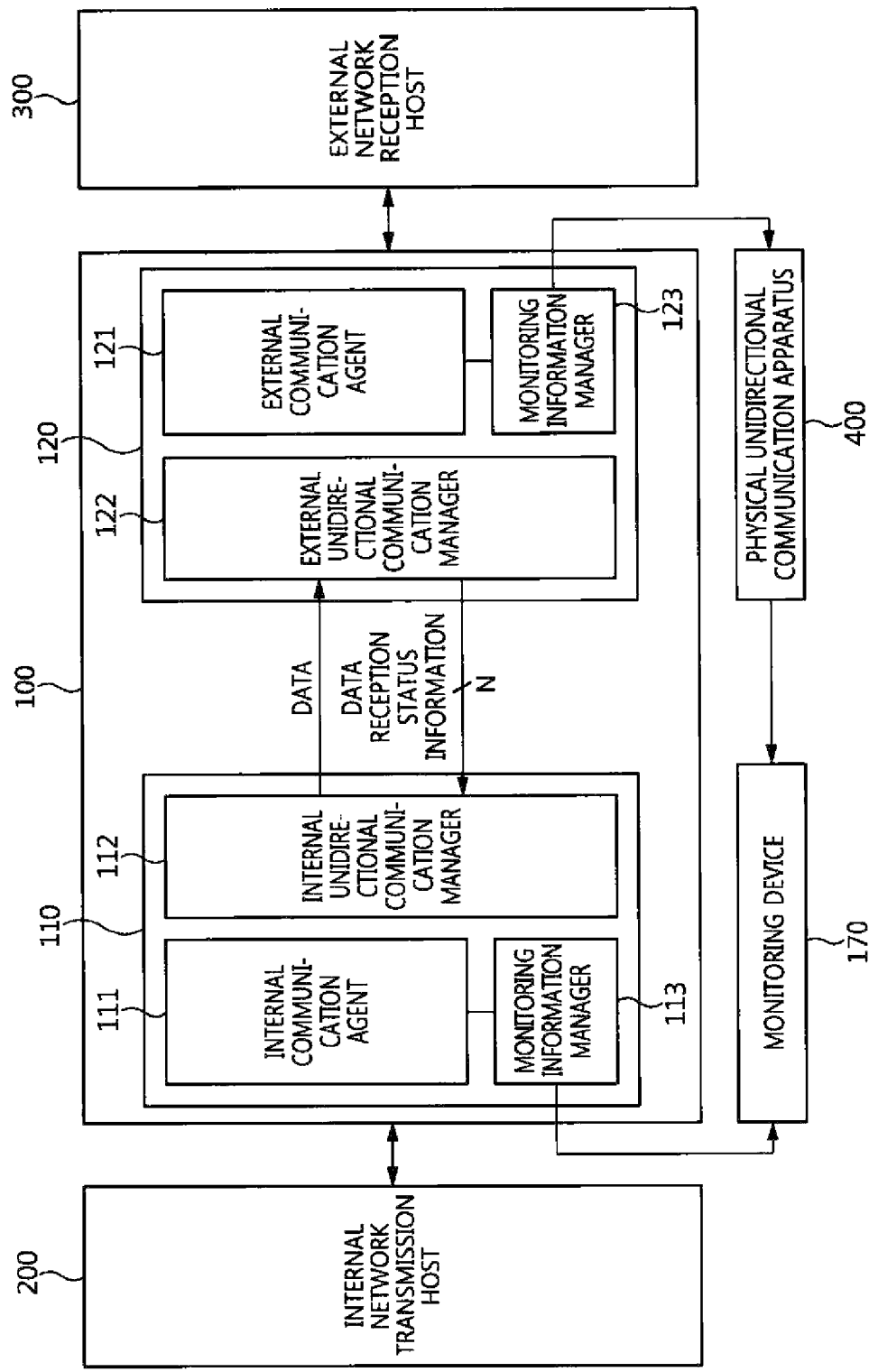
FIG. 5 is a diagram showing a state in which a monitoring device located in an internal network is connected to the physical unidirectional communication apparatus according to an embodiment of the present invention.

FIG. 5 is a diagram showing a state in which a monitoring device located in an internal network is connected to the physical unidirectional communication apparatus according to an embodiment of the present invention.

The present invention relates to an apparatus and method for linking data while separating the network. Therefore, the status of the physical unidirectional communication apparatus 100 needs to be determined from a remote place, but it cannot be carelessly monitored. The reason for this is that an internal network and an external network are internally separated from each other to have a physical unidirectional communication structure. Therefore, the status of the internal network and the external network cannot be determined at a single place.

If the internal network and the external network are simultaneously and directly connected to perform monitoring, a monitoring system itself may be misused as a detour path, and then physical unidirectionality cannot be guaranteed.

In the present invention, the status information of the physical unidirectional communication apparatus 100 is transmitted using a designated Internet Protocol (IP) address or port using a User Datagram Protocol (UDP). For the security of the system, the present invention presents a structure for enabling the status of the internal network and the external network to be checked via a single monitoring device 170 without generating a separate connection.

A monitoring structure presented in the present invention may include, according to the monitoring situation, three examples including a first example in which the monitoring device 170 is present in the internal network; a second example in which the monitoring device 170 is present in the external network; and a third example in which intrusion into the monitoring device 170 is impossible.

FIG. 5 illustrates an example in which the monitoring device 170 located in the internal network is connected to the physical unidirectional communication apparatus 100.

To connect the internal network connection system unit 110 to the monitoring device 170, a monitoring information manager 113 is provided in the internal network connection system unit 110, so that the internal network connection system unit 110 is connected to the monitoring device 170. Further, to connect the external network connection system unit 120 to the monitoring device 170, a monitoring information manager 123 is provided in the external network connection system unit 120, so that the external network connection system unit 120 is connected to the monitoring device 170.

Here, in order for the monitoring device 170 to check the status of the external network, the monitoring device 170 must be connected to the external network. In order to guarantee the security of this connection, the monitoring device 170 is connected to the external network through a separate physical unidirectional communication apparatus 400.

Figure 6:
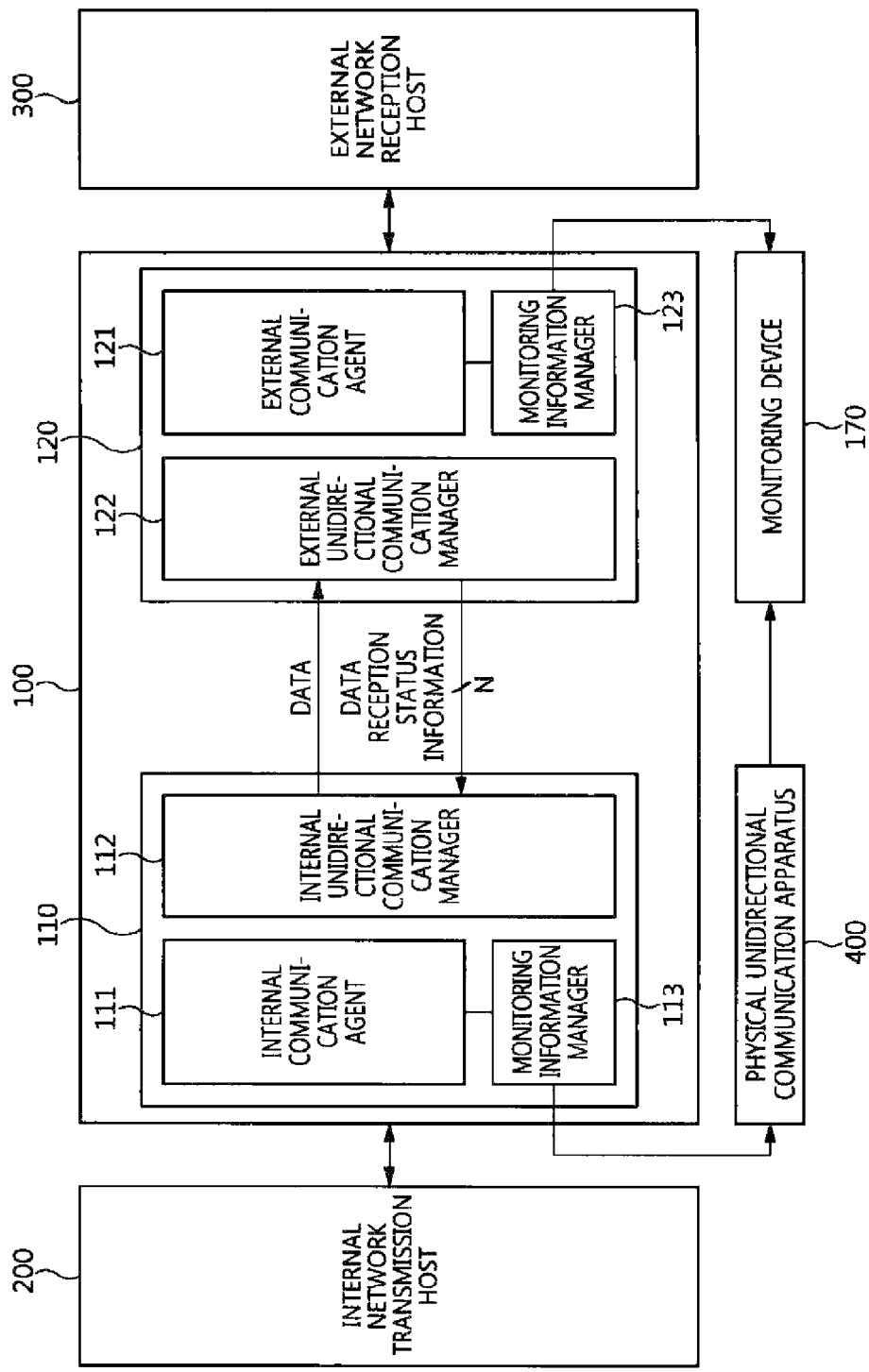
FIG. 6 is a diagram showing a state in which a monitoring device located in an external network is connected to the physical unidirectional communication apparatus according to an embodiment of the present invention.

FIG. 6 is a diagram showing a state in which a monitoring device located in an external network is connected to the physical unidirectional communication apparatus according to an embodiment of the present invention.

FIG. 6 illustrates an example in which the monitoring device 170 located in the external network is connected to the physical unidirectional communication apparatus 100.

When the monitoring device 170 is present in the external network, it is connected to the external network connected to the physical unidirectional communication apparatus 100. In order for the monitoring device 170 to check the status of the internal network, it must be connected to the internal network. In order to guarantee the security of this connection, the monitoring device 170 is connected to the internal network through a separate physical unidirectional communication apparatus 400.

Figure 7:
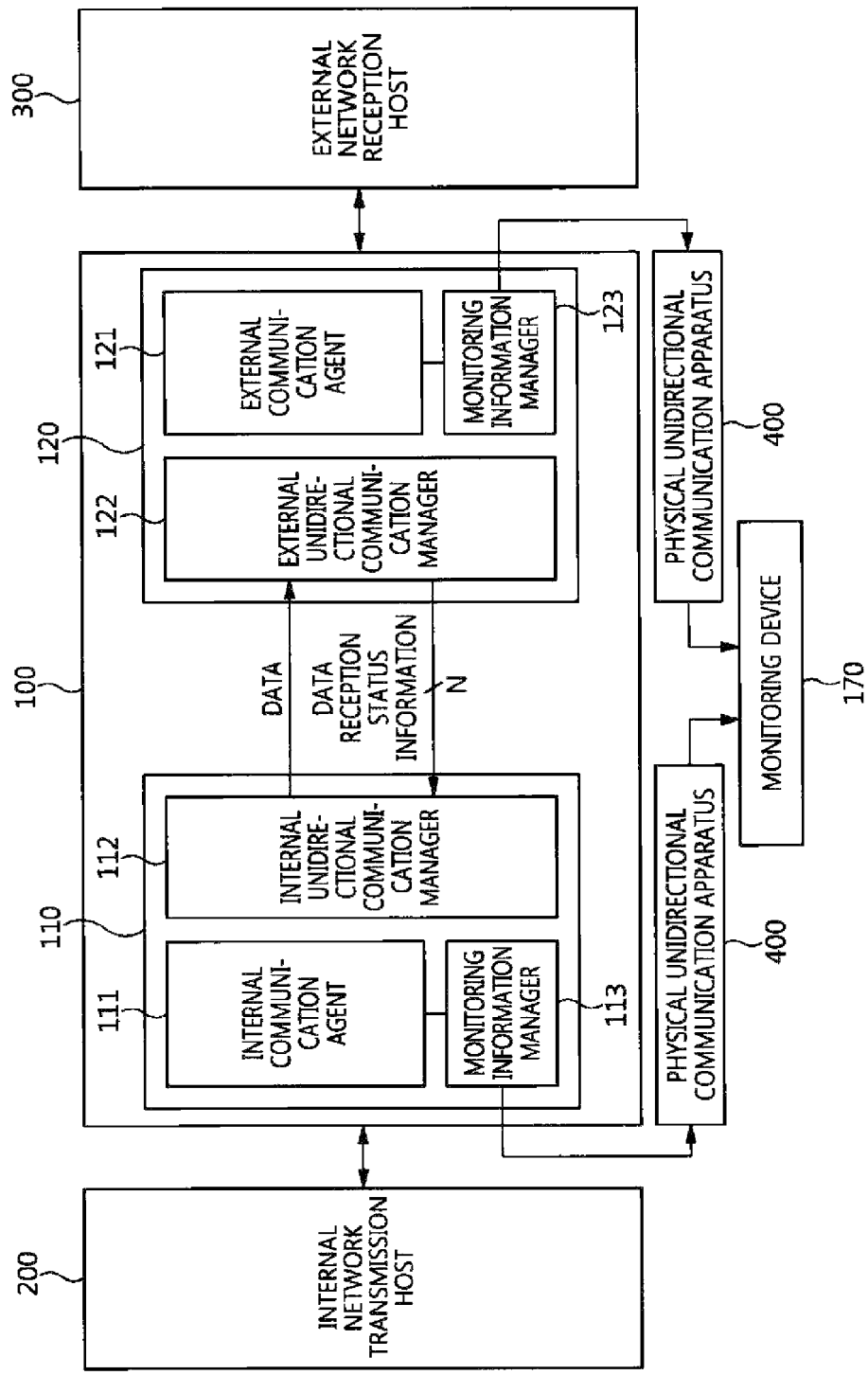
FIG. 7 is a diagram showing a configuration in which external intrusion into the monitoring device of the physical unidirectional communication apparatus is impossible according to an embodiment of the present invention.

FIG. 7 is a diagram showing a configuration in which external intrusion into the monitoring device of the physical unidirectional communication apparatus is impossible according to an embodiment of the present invention.

FIG. 7 illustrates an example in which the monitoring device 170 connected to the physical unidirectional communication apparatus 100 is configured to make intrusion from the internal network and, the external network impossible.

In order to implement such a configuration, as shown in FIG. 7, the monitoring device 170 is individually connected to the internal network and to the external network through separate physical unidirectional communication apparatuses 400.

Here, although not shown in the drawing, it is also possible to connect separate monitoring devices 10 to the internal network and to the external network, respectively, and to determine the status of the internal network and the external network via the respective monitoring devices 170.

When the structures presented in FIGS. 5 to 7 are utilized, the monitoring device 170 may be protected, and a possibility to misuse the monitoring device 170 as a detour path may be fundamentally prevented. By means of such a structure, the entire status of the system may be determined from a remote place, thus maintaining, convenience and security.

Figure 8:
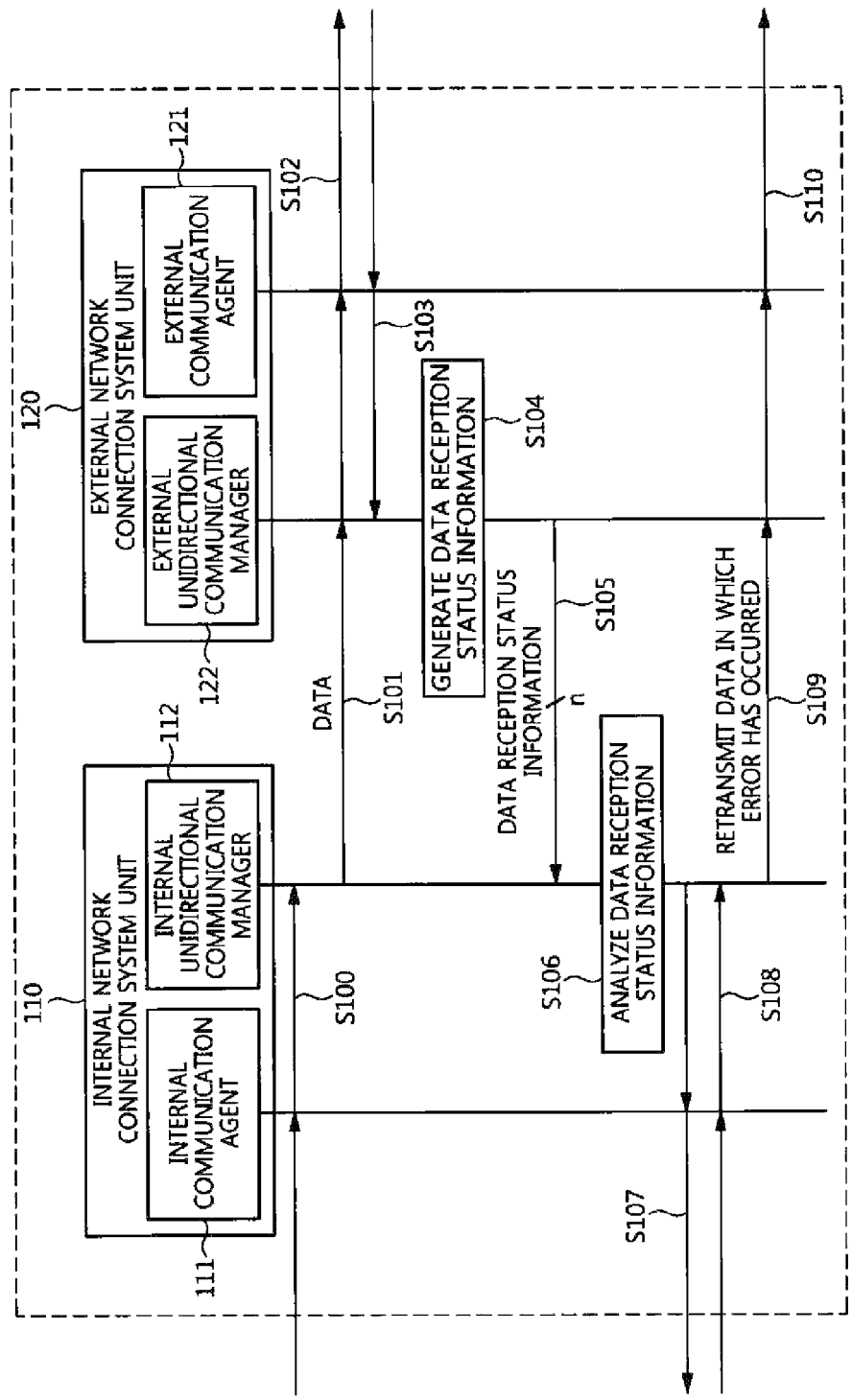
FIG. 8 is a diagram showing a physical unidirectional communication method according to an embodiment of the present invention.

FIG. 8 is a flow diagram showing a physical unidirectional communication method according to an embodiment of the present invention.

At step S100, transmission data is received from the internal network.

At step S101, the internal network connection system unit 110 transmits the transmission data to the external network connection system unit 120 through the unidirectional data transmission line 130.

At step S102, the external network connection system unit 120 transmits the transmission data to the external network.

At step S103, the reception status information of the transmission data is received from the external network.

Here, step S103 corresponds only to a case where a specific system present in the external network that is the destination of the transmission data analyzes the received transmission data and generates the reception status information of the transmission data.

At step S104, the external unidirectional communication manager 122 of the external network connection system unit 120 generates data reception status information depending on the reception status of the transmission data.

At step S105, the generated data reception status information is transmitted from the external network connection system unit 120 to the internal network connection system unit 110 through the data reception status transmission line 140.

At step S106, the internal unidirectional communication manager 112 of the internal network connection system unit 110 analyzes the received data reception status information.

At step S107, the internal unidirectional communication manager 112 requests the internal network system to retransmit corresponding transmission data when transmission data in which an error has occurred is determined to be present as a result of the analysis of the data reception status information.

At step S108, the transmission data in which an error has occurred is received again from the internal network system.

At step S109, the internal network connection system unit 110 retransmits the transmission data in which an error has occurred to the external network connection system unit 120 through the unidirectional data transmission line 130.

At step S110, the external network connection system unit 120 retransmits the transmission data to the corresponding external network.

Figure 9:
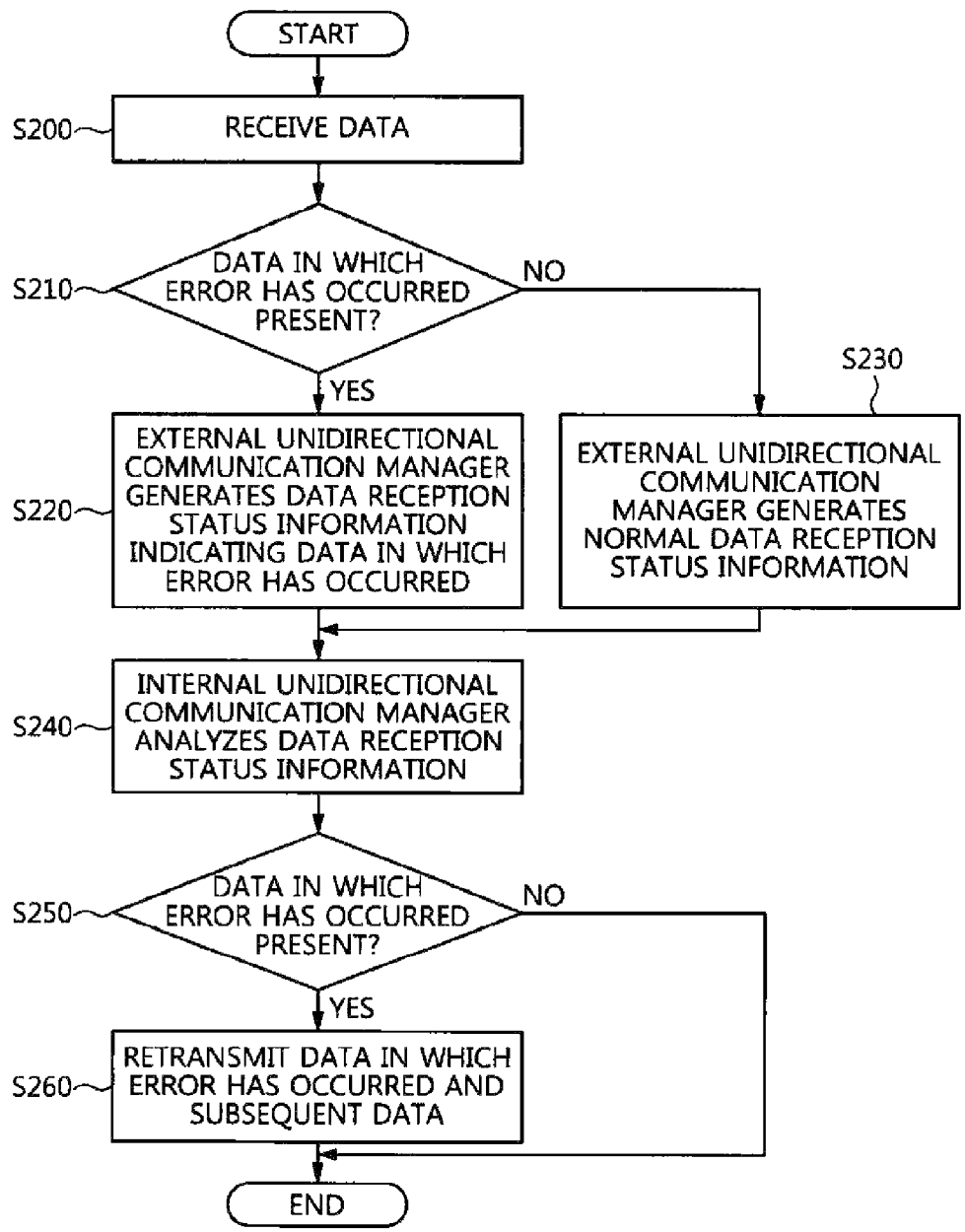
FIG. 9 is a flowchart showing a procedure in which the physical unidirectional communication apparatus performs management so that data in which an error has occurred is retransmitted according to an embodiment of the present invention.

FIG. 9 is a flowchart showing a procedure in which the physical unidirectional communication apparatus performs management so that transmission data in which an error has occurred is retransmitted according to an embodiment of the present invention.

At step S200, the physical unidirectional communication apparatus 100 receives transmission data.

That is, at this step, when the physical unidirectional communication apparatus 100 of the present invention functions as a relay for transmitting the data of the internal network to the external network, the transmission data is received from the internal network.

At step S210, it is determined whether an error has occurred in the transmission data.

Here, the determination of an error occurring in the transmission data may be performed either by the external network system that receives the transmission data or by the external unidirectional communication manager 122 of the physical unidirectional communication apparatus 100 according to the present invention.

At step S220, if an error has occurred in the transmission data, the external unidirectional communication manager 122 generates data reception status information including the transmission data in which the error has occurred.

At step S230, if an error has not occurred in the transmission data, the external unidirectional communication manager 122 generates normal data reception status information.

At step S240, the internal unidirectional communication manager 112 analyzes the data reception status information received through the data reception status transmission line 140. The internal unidirectional communication manager 112 detects information about the transmission data by analyzing the data reception status information.

At step S250, the internal unidirectional communication manager 112 determines whether an error has occurred in the transmission data by analyzing the data reception status information.

At step S260, the internal network connection system unit 110 retransmits data at time at which the error occurred and subsequent data.

Figure 10:
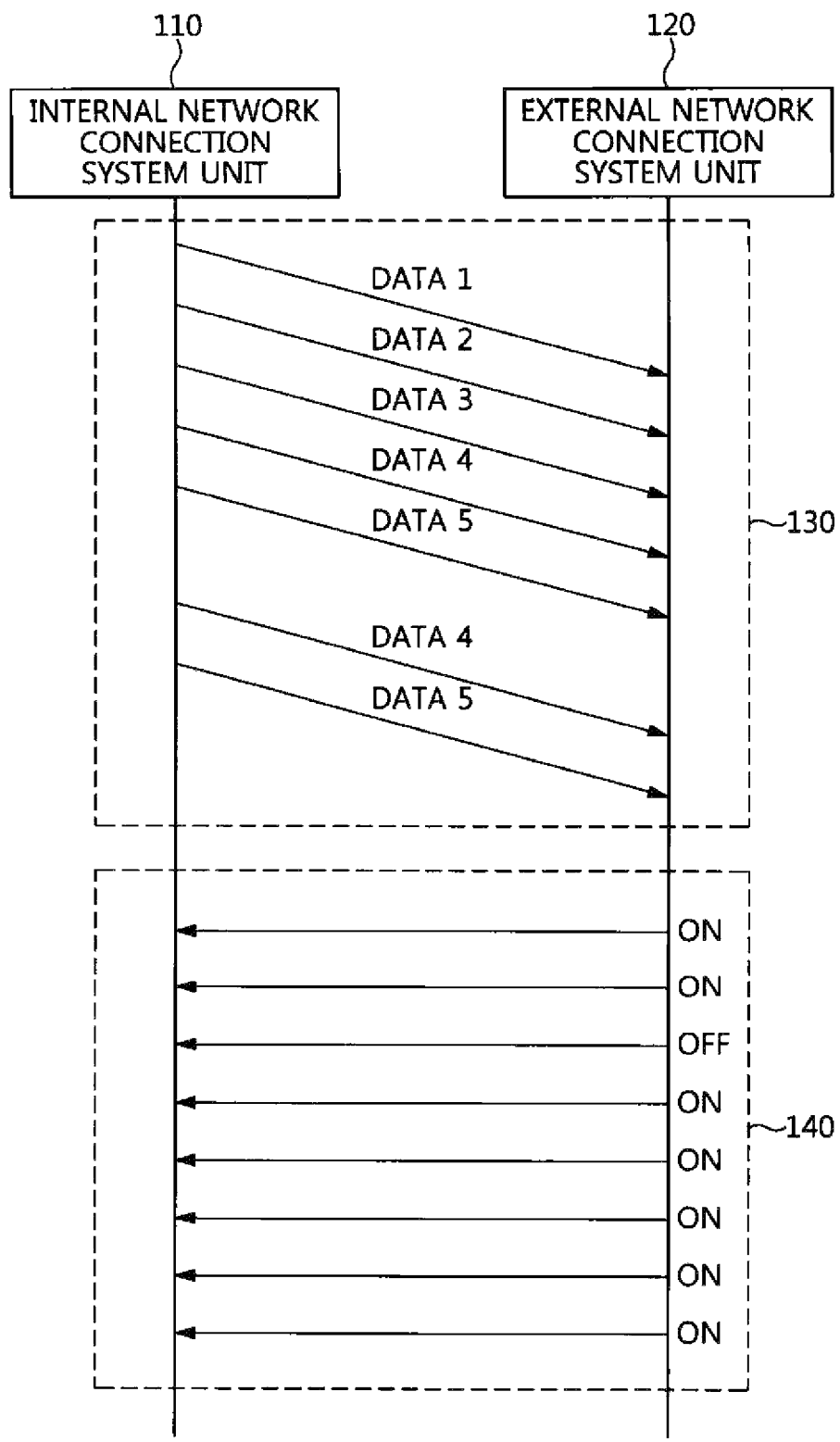
FIG. 10 is a diagram showing a method of displaying data in which an error has occurred according to an embodiment of the present invention.

FIG. 10 is a diagram showing a method for displaying data in which an error has occurred according to an embodiment of the present invention.

As described above, the data reception status transmission line 140 transmits only electrical ON/OFF signals without being able to transfer data.

Here, the data reception status transmission line 140 may be composed of N lines.

The ON/OFF settings of respective lines may be allocated only by the external unidirectional communication manager 122 of the external network connection system unit 120. Further, the internal unidirectional communication manager 112 of the internal network connection system unit 110 reads the states of the respective lines and performs an operation such as data retransmission by utilizing the line states.

The usage examples of the respective lines of the data reception status transmission line 140 are given in the following Table 1.

TABLE 1

| | No. | Description |
|---|---|---|
| System Code | 1 | Unidirectional section transmission preparation status |
| | 2 | Unidirectional section transmission mode (feedback for all packets, feedback for unit of N packets) |

TABLE 1-continued

| | No. | Description |
|---|---|---|
| | 3 | Feedback for unidirectional section reception |
| | 4 | Feedback for external interface connection status |
| Error Code | 5-8 | Additional error status |

For example, the application plan of the data reception status transmission line 140 to remove data loss in the unidirectional data transmission line 130 is given as follows.

When the usage described in Table 1 is a basis, it is assumed, that data 1 to data 5 are transmitted from the internal network connection system unit 110 to the external network connection system unit 120 through the unidirectional data transmission line 130, and that the external network connection system unit 120 receives only data 1 to data 3 and data 5 due to an error occurring in data 4.

In this case, the external unidirectional communication manager 122 of the external network connection system unit 120 recognizes that data 4 has been lost, and switches the line 3 of the data reception status transmission line 140 to an OFF state. The internal unidirectional communication manager 112 of the internal network connection system unit 110 recognizes that the line 3 of the data reception status transmission line 140 has switched to the OFF state, and retransmits data from the time at which the error occurred. That is, pieces of data ranging from data 4 are retransmitted. Here, the unit of a packet to be checked may be variably applied.

FIG. 10 illustrates the above procedure.

Next, a method of utilizing the data reception status transmission line 140 to prevent loss caused by the problem of the external network connection system itself will be described below. When the above-described usage of individual lines of the data reception status transmission line 140 is a basis, line 1 is utilized to solve such a problem. When the external network connection system is normally operated, the line 1 is set to an ON state, whereas when an error occurs in the system, the line 1 is switched to, an OFF state.

When this method is used, data loss that occurs because the internal network connection system cannot know the status of the external network connection system and then transmits data may be prevented.

Next, a method of utilizing individual lines of the data reception status transmission line 140 to prevent loss caused by the problem of the external network connection system will be described using the following example.

When the above-described usage of individual lines of the data reception status transmission line 140 is a basis, line 4 may be utilized to prevent loss so as to solve such a problem. The data reception status transmission line 140 of the present invention must be connected to the external network reception host 300 depending on the characteristics of service (data transfer service) provided by the physical unidirectional communication apparatus 100 according to the present invention. Therefore, connection status (connection establishment or connection release) is checked, and the line 4 of the data reception status transmission line 140 is set to an OFF state when a connection is not established. The internal network connection system unit 110 does not perform transmission itself for the corresponding service when the state of the line 4 of the data reception status transmission line 140 is OFF. By means of this method, data loss caused by the problem of the external network reception host 300 may be prevented.

The possibility of malicious behavior through the data reception status transmission line 140 may be defined as three types. That is, the three types correspond to a method using overflow vulnerabilities, a method using the possibility of data being transmitted through the section of the data reception status transmission line 140, and a method of inducing abnormal behavior by combining the line states of the data reception status transmission line 140. The present invention presents the following methods so as to eliminate even the slightest possibility of malicious behavior.

First, there is a prevention method related to the method using overflow vulnerabilities. The data reception status transmission line 140 proposed by the present invention performs a function of transferring status using electrical ON/OFF signals. Therefore, data transmission via the corresponding line is unavailable. Further, the external unidirectional communication manager 122, which sets and releases the section information of the data reception status transmission line 140, manages the state of each line as a single variable. The number of such variables is N corresponding to the number of lines of the data reception status transmission line 140, and does not increase or decrease over time.

Furthermore, the state of the corresponding variable may be set only to TRUE or FALSE. Therefore, malicious behavior using overflow vulnerabilities may be fundamentally prevented.

In the method using the possibility of data being transmitted through the data reception status transmission line 140, a situation may occur where there is the slightest possibility of data being transmitted through the data reception status transmission line 140. However, the present invention has a structure in which each line of the data reception status transmission line 140 has only ON/OFF state information, thus fundamentally preventing the transmission of data through the data reception status transmission line 140.

The method of inducing abnormal behavior by combining the line states of the data reception status transmission line 140 also assumes that the external network connection system has been seized by an attacker.

A portion influencing the availability of the system corresponds to lines of system codes 1 to 4, which are exemplified among the sections of the data reception status transmission line 140. It is assumed that the attacker forged line 3 and line 4 to obtain meaningful results.

Line 3, which has a structure for guaranteeing the reliability of data in a unidirectional section, is configured to, when the line 3 is turned off, retransmit data in the corresponding portion. When the attacker arbitrarily sets the state of line 3 to an OFF state, the internal network connection system has the possibility of infinitely retransmitting the data in the portion.

Therefore, the present invention is configured to count the number of retransmissions for the same data, and if the number of retransmissions reaches a predetermined number or more, stop the retransmission to the external network connection system, and terminate connection to and data linkage to the internal network transmission host 200.

Line 4 provides setting information for the external interface. When data linkage begins in a state in which an attacker forges the line 4 and communication with the external network reception host 300 is impossible, there is the possibility of a load and error occurring in the external network connection system unit 120. Therefore, the internal unidirectional communication manager 112 of the internal network connection system unit 110, which checks the status information of the data reception status transmission line 140, has a whitelist for a normal situation and has a structure of performing functions based on the whitelist. By means of this method, malicious behavior conducted via the data reception status transmission line 140 may be blocked.

The present invention is advantageous in that a separate data reception status transmission line capable of transferring data reception status information is added to transfer the status of a receiving side, data reception status, etc. to a transmitting side, thus guaranteeing the reliability of data transmission in a unidirectional section.

Further, the present invention is advantageous in that various types of control systems considering the reliability of data to be important may be stably operated.

Although the present invention has been described with reference to the embodiments of the present invention, those skilled in the art will appreciate that various changes and modifications are possible, without departing from the scope and spirit of the invention as disclosed in the accompanying claims.

What is claimed is:

1. A physical unidirectional communication apparatus, comprising:
   a unidirectional data transmission line for transmitting transmission data in a unidirectional direction;
   a data reception status transmission line including N lines (N is a natural number), each of the N lines configured transmitting electrical On/Off signal to represent reception status information without being able to transmit the transmission data;
   an internal network connection system unit for performing communication with an internal network transmission host and transmitting the transmission data to an external network connection system unit through the unidirectional data transmission line; and
   the external network connection system unit for performing communication with an external network reception host,
   receiving the transmission data, from the internal network connection system unit,
   generating the reception status information of the transmission data, and
   transmitting the reception status information to the internal network connection system unit through the data reception status transmission line.

2. The physical unidirectional communication apparatus of claim 1, wherein the internal network connection system unit comprises:
   an internal communication agent for receiving the transmission data from the internal network transmission host and transmitting the transmission data to a unidirectional communication manager; and
   an internal unidirectional communication manager for transmitting the transmission data to the external network connection system unit through the unidirectional data transmission line, and wherein the external network connection system unit comprises:
   an external communication agent for transmitting the transmission data received from the internal network connection system unit to the external network reception host; and
   an external unidirectional communication manager for analyzing the transmission data received from the internal network connection system unit, generating the reception status information, and transmitting the reception status information to the internal unidirectional communication manager.

3. The physical unidirectional communication apparatus of claim 1, wherein the unidirectional data transmission line is connected to a diode so that the transmission data is transmitted only in the unidirectional direction from the internal, network connection system unit to the external network connection system unit.

4. The physical unidirectional communication apparatus of claim 1, wherein each of the N lines (N is a natural number) securely transfers various types of the status information of the external network connection system unit to the internal network connection system unit.

5. The physical unidirectional communication apparatus of claim 4, wherein each line of the data reception status transmission line is connected to a diode to block an electrical signal to be transferred in a direction from the internal network connection system unit to the external network connection system unit.

6. The physical unidirectional communication apparatus of claim 2, wherein the internal unidirectional communication manager or the external unidirectional communication manager deactivates an auto-medium dependent interface crossover (MDIX) function so as to prevent data from being transmitted from an external network to an internal network through the unidirectional data transmission line.

7. The physical unidirectional communication apparatus of claim 2, wherein:
the external unidirectional communication manager analyzes the received transmission data, generates the reception status information requiring retransmission of transmission data in which an error has occurred, and transmits the reception status information to the internal unidirectional communication manager, and
the internal unidirectional communication manager receives and analyzes the reception status information, detects the transmission data in which the error has occurred, and performs control such that data ranging from the transmission data in which the error has occurred is retransmitted.

8. The physical unidirectional communication apparatus of claim 2, wherein:
the internal unidirectional communication manager includes memory for storing information obtained from communication with the internal communication agent, and periodically initializes the memory so that the information obtained from communication with the internal communication agent does not remain in the memory, and the external unidirectional communication manager includes memory for storing information obtained from communication with the external communication agent, and periodically initializes the memory so that the information obtained from communication with the external communication agent does not remain in the memory.

9. The physical unidirectional communication apparatus of claim 2, further comprising:
a monitoring device configured to monitor an operation and data communication status of the physical unidirectional communication, apparatus via the monitoring device.

10. The physical unidirectional communication apparatus of claim 9, wherein when the monitoring device is present in the internal network, the internal network connection system unit includes a monitoring information manager, and the monitoring device is directly connected to the monitoring information manager and is connected to the external network connection system unit through the physical unidirectional communication apparatus.

11. The physical unidirectional communication apparatus of claim 9, wherein in response to detection of the monitoring device being present in the external network, the monitoring device is connected to the internal network connection system unit through the physical unidirectional communication apparatus.

12. The physical unidirectional communication apparatus of claim 9, wherein the monitoring device is connected to the internal network connection system unit and to the external network connection system unit through respective physical unidirectional communication systems.

13. A physical unidirectional communication method, comprising:
receiving, by an internal network connection system unit, transmission data from an internal network;
transmitting the transmission data to an external network connection system unit through a physically configured unidirectional data transmission line for transmitting transmission data in a unidirectional direction;
generating, by an external unidirectional communication manager, data reception status information of the transmission data and transmitting the data reception status information to the internal network connection system unit through a data reception status transmission line which includes N lines (N is a natural number), each of the N lines configured transmitting electrical On/Off signal to represent the data reception status information without being able to transmit the transmission data;
analyzing, by an internal unidirectional communication manager, the data reception status information; and
retransmitting, by the internal unidirectional communication manager, data in which an error has occurred to the external network connection system unit through the unidirectional data transmission line.

14. The physical unidirectional communication method of claim 13, wherein transmitting the transmission data to the external network connection system unit through the physically configured unidirectional data transmission line comprises deactivating an auto-medium dependent interface crossover (MDIX) function, thus enabling data to be transferred only in one direction from the internal network connection system unit to the external network connection system unit.

15. The physical unidirectional communication method of claim 13, wherein:
the internal unidirectional communication manager includes memory for storing information obtained from communication with an internal communication agent, and periodically initializes the memory so that the information obtained from communication with the internal communication agent does not remain in the memory, and the external unidirectional communication manager includes memory for storing information obtained from communication with an external communication agent, and periodically initializes the memory so that the information obtained from communication with the external communication agent does not remain in the memory.

16. The physical unidirectional communication method of claim 13, further comprising:
in response to detection of retransmission of identical data repeatedly occurring as a result of analysis of the data reception status information,
counting, by the internal unidirectional communication manager, a number of retransmissions, and stopping retransmission of the transmission data to the external network connection system unit if the number of retransmissions reaches a predetermined number or more.

17. The physical unidirectional communication method of claim 13, further comprising:
monitoring operation and data communication status of a physical unidirectional communication apparatus via a monitoring device.

* * * * *